United States Patent
Wykoff

(10) Patent No.: US 7,547,046 B2
(45) Date of Patent: Jun. 16, 2009

(54) PNEUMATIC CONVEYING LINE COMPONENT

(75) Inventor: Curtiss F. Wykoff, Hughesville, PA (US)

(73) Assignee: The Young Industries, Inc., Muncy, PA (US)

( * ) Notice: Subject to any disclaimer, the term of this patent is extended or adjusted under 35 U.S.C. 154(b) by 395 days.

(21) Appl. No.: 11/130,143

(22) Filed: May 17, 2005

(65) Prior Publication Data

US 2008/0007066 A1    Jan. 10, 2008

(51) Int. Cl.
F16L 41/00    (2006.01)

(52) U.S. Cl. .................. 285/189; 285/901; 285/409; 285/129.1

(58) Field of Classification Search .......... 285/901, 285/407, 409, 365, 189, 129.1, 129.2, 124.4; 414/328; 406/98
See application file for complete search history.

(56) References Cited

U.S. PATENT DOCUMENTS

| | | | | |
|---|---|---|---|---|
| 500,701 A * | 7/1893 | Abbott et al. | ............... | 285/189 |
| 848,759 A * | 4/1907 | Mern | ............... | 285/901 |
| 982,923 A * | 1/1911 | Barby | ............... | 406/130 |
| 2,261,774 A * | 11/1941 | Miller | ............... | 285/189 |
| 2,881,796 A * | 4/1959 | Garraway | ............... | 285/189 |
| 3,151,887 A * | 10/1964 | Barry et al. | ............... | 285/189 |
| 3,363,680 A * | 1/1968 | Baker | ............... | 285/382 |
| 3,793,701 A * | 2/1974 | Chartet | ............... | 285/407 |
| 3,834,740 A * | 9/1974 | Bazant et al. | ............... | 285/189 |
| 4,116,491 A * | 9/1978 | Ply | ............... | 406/89 |
| 4,717,048 A * | 1/1988 | Stenger | ............... | 285/409 |
| 4,733,722 A * | 3/1988 | Forbes et al. | ............... | 285/189 |
| 5,664,626 A * | 9/1997 | Watts, III | ............... | 285/901 |
| 5,667,253 A * | 9/1997 | Jansen et al. | ............... | 285/901 |

* cited by examiner

Primary Examiner—David E Bochna
(74) Attorney, Agent, or Firm—Novak Druce & Quigg LLP

(57) ABSTRACT

A component of a transport line for pneumatically conveying bulk materials generally including a first conduit having an open end, a second conduit connected to the first conduit at an angle relative thereto having the interior thereof communicating with the interior of the first conduit to provide a material flow passageway therethrough and a cap member detachably mounted on the first conduit, closing the open end thereof.

19 Claims, 2 Drawing Sheets

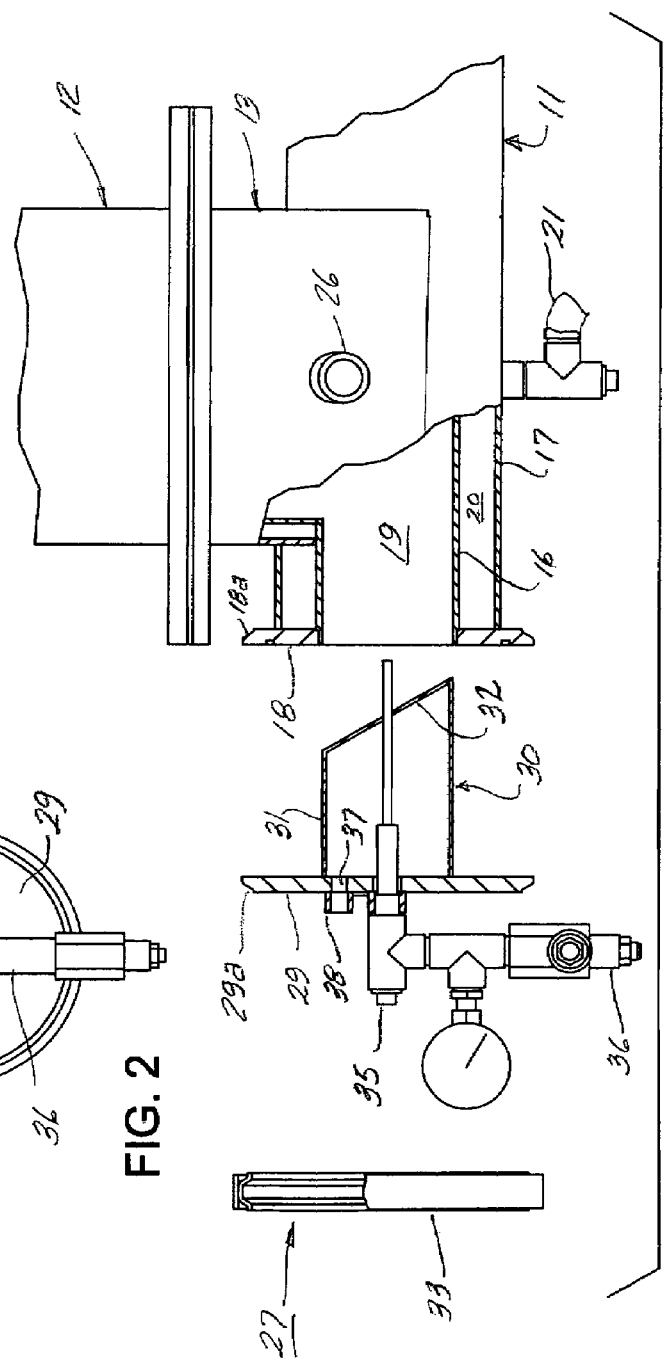

PNEUMATIC CONVEYING LINE COMPONENT

This invention relates to a transport line for pneumatically conveying bulk materials and more particularly to a component of such line adapted to be connected together with other components in a selected configuration to provide a desired flow path for such material. This invention further contemplates such a component that is designed to facilitate to cleaning of the interior thereof.

BACKGROUND OF THE INVENTION

In many industries including the pharmaceutical, food processing, chemical, plastics, cosmetics, mining and other industries, transport lines are utilized for pneumatically conveying bulk materials from one site to another. Typically, such lines consist of a number of conduits connected together in end-to-end relation, configured to provide a desired flow path of the material to be conveyed. Examples of systems utilizing such transport lines are illustrated and described in U.S. Pat. Nos. 6,609,871; 6,719,500; 6,722,822 and 6,764,253 which are incorporated herein by reference. Often, in order to avoid the growth of bacteria or insect infestation which could taint the product being handled, particularly in the pharmaceutical and food processing industries, it is required that such lines be cleaned regularly and thoroughly. Cleanliness also is required in applications where different types of material are handled by the same conveying line. An example of such application would be the handling of differently colored pigments where cross-contamination of color cannot be tolerated.

In conveying lines utilizing a number of such conduits arranged in end-to-end relation, usually connected together by clamps, bolts or other fastening means, in order to clean the interiors of such conduits, it is required to disassemble such conduits to obtain access to the interiors thereof and then reassemble them after cleaning which not only is labor intensive but time consuming, requiring the removal of the conveying line from production. In view of such shortcoming of existing conveying lines, it has been found to be desirable to provide a product conveying line made up of a number of conduit segments which may be cleaned while maintaining to a minimum the number of such segments that must be disassembled and then reassembled.

SUMMARY OF THE INVENTION

The principal object of the present invention is achieved by providing a component of a pneumatic conveying line for transporting bulk materials which generally consists of a first conduit having an open end, a second conduit connected to the first conduit at an angle relative thereto, having the interior thereof communicating with the interior of the first conduit to provide a material flow path therethrough and a cap member detachably mounted on the first conduit, closing the open end thereof. Preferably, the open end of the conduit is provided with a peripheral mounting flange and the cap member is provided with a peripheral portion which may be mated with the peripheral flange of the conduit and clamped thereto by means of a quick disconnect clamp to permit the easy and quick removal of the cap member to provide access to the interior of the conduit without having to remove the conduit from the conveying line. In addition, the cap member may be provided with a nozzle connectable to a source of fluid under pressure for injecting a gas under pressure into the conduit to assist in impelling the flow of material through the conduit. Where the configuration of the line permits, a single conduit or a set of aligned conduits can be provided with cap members on opposite ends thereof which may be removed to obtain access to the interiors of such conduits.

BRIEF DESCRIPTION OF THE DRAWINGS

FIG. 2 is an end view of the component shown in FIG. 1; and

FIG. 3 is a partial, enlarged view of the component shown in FIG. 1, illustrating several parts thereof in exploded relation.

DETAILED DESCRIPTION OF AN EMBODIMENT OF THE INVENTION

Figure 1:
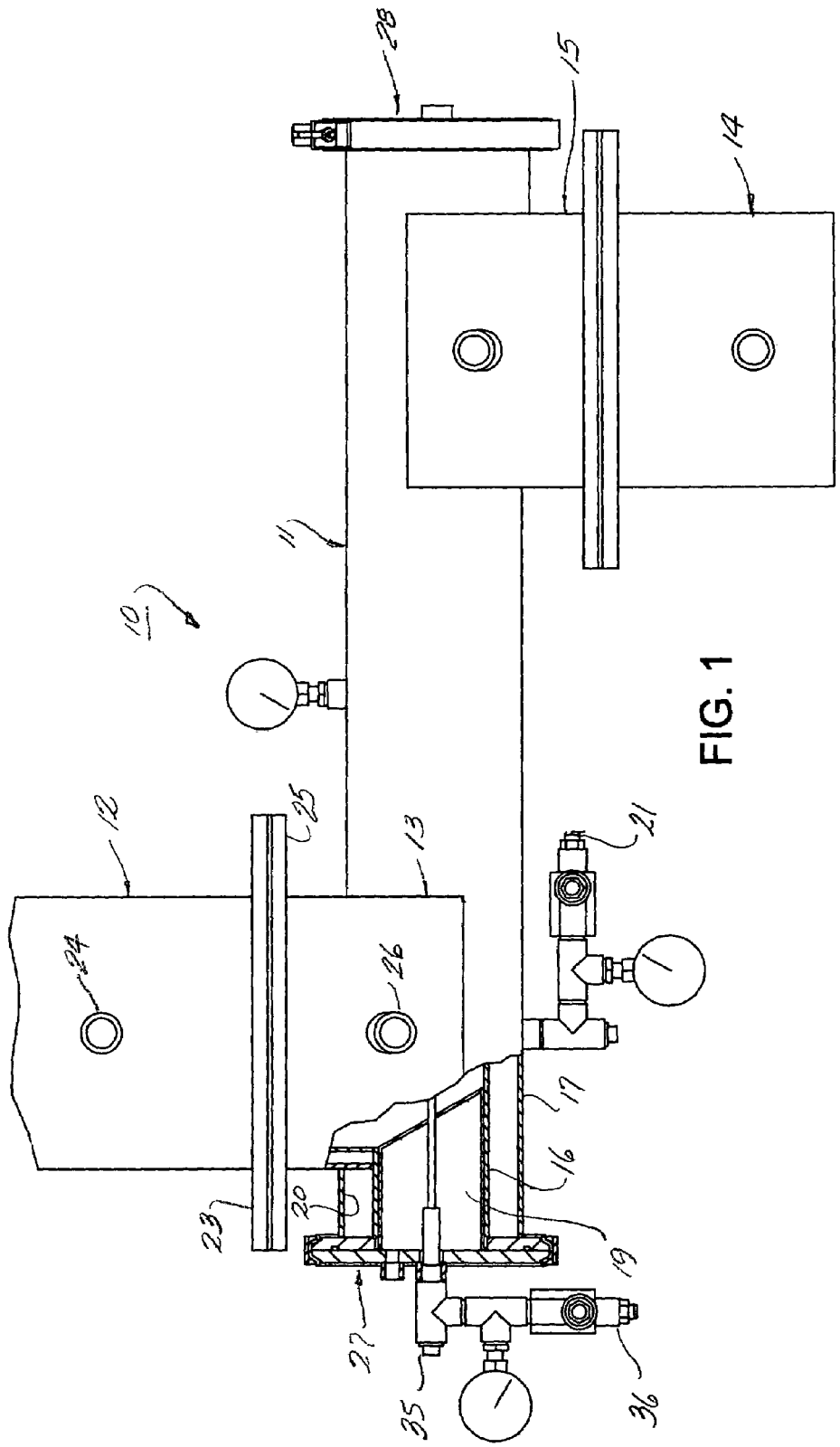
FIG. 1 is a side elevational view of a component of a transporting line for pneumatically conveying a bulk material, having a portion thereof broken away.

Referring to the drawings, there is illustrated a component 10 of a transporting line for pneumatically conveying a bulk material in a system as illustrated and described in the aforementioned references. The component includes a conduit 11, a conduit 12 connected to conduit 11 by means of a transition conduit 13 and a conduit 14 connected to conduit 11 by means of a transition conduit 15. Conduit 11 is comparable to the conduits of the transport lines illustrated and described in the aforementioned references and includes an inner gas permeable conduit 16 and an outer, gas impermeable conduit 17 encompassing and spaced from conduit 16. Each of the ends of conduit 11 is provided with an annular, end plate 18 to provide an inner material flow passageway 19 and an annular chamber 20. Outer, impermeable conduit 17 further is provided with an inlet connected by means of a conduit 21 to a source of gas under a selected pressure which is supplied into annular chamber 20 and through inner, permeable conduit 16 to form a boundary layer in passageway 19 consisting of a mixture of fluidizing air and material particles for enhancing the flow of material through passageway 19.

Conduit 12 is configured similar to conduit 11, including an inner permeable conduit defining a material flow passageway and an outer, impermeable conduit encompassing and spaced from such inner, permeable conduit to provide an annular chamber, and a pair of peripheral end plates 23 (only one of which is shown). The outer conduit of conduit 12 is provided with an air inlet 24 for supplying fluidizing air to the annular space therein for enhancing the flow of material therethrough. Transition conduit 13 also is provided with an inner, permeable wall defining a material flow passageway intercommunicating the material flow passageways of conduits 11 and 12, and an outer peripheral impermeable wall spaced from the inner, permeable wall providing an annular chamber, secured to the outer wall of conduit 11 preferably by wielding and provided with a peripheral flange 25 which may be mated to and detachably connected to connecting flange 23 of conduit 12. The outer wall of transition conduit 13 also is provided with an inlet 26 which may be connected to a suitable source of gas under pressure to provide a fluidizing gas to the annular chamber of the transition section to similarly enhance the flow of material therethrough. Conduit 14 and transition conduit 15 are comparable to conduit 12 and transition section 13, respectively, in construction and function.

Closing the ends of conduit 11 is a set of cap members 27 and 28. As best shown in FIGS. 2 and 3, cap member 27 includes a circular plate 29 adapted to mate with annular end flange 18, having a beveled edge 29a cooperable with beveled edge 18a of flange 18, and a projecting section 30 which is received within passageway 19 of conduit 11 when plate 29 is mated with end flange 18. Projecting section 30 includes a cylindrical side wall 31 having a diameter slightly less than the inner diameter of inner conduit 26 to permit section 30 to be received within passageway 19 and an end wall 32 disposed at about a 60° angle relative to the axis of the side wall thereof so that it extends from the inner permeable wall of transition section 13 to the inner permeable wall 16 of conduit 11 when the cap member is mounted on conduit 11 with plate 29 mated with annular flange 18 and projecting section 30 inserted in passageway 19, for deflecting the flow of material from the passageway in conduit 12 through the passageway of transition conduit 13, into passageway 19 of conduit 11. Side wall 31 is formed of a gas impermeable material and end wall 32 is formed of a gas permeable material. A fluidizing gas is supplied to projecting section 30 through an inlet 38. The cap member is detachably secured in position as shown in FIG. 1 by means of a removable circular clamp 33 as best shown in FIG. 2. Such clamp is of a conventional construction having annular surfaces circumventing and engaging beveled edges 29*a* of plate 29 and 18*a* of annular flange 18 to secure such members together by means of an actuating lever 34 which may be pivoted to biasingly engage the two mating members and secure them together.

Mounted on cap plate 29, extending through openings in cap plate 29 and end wall 32 of section 30 and disposed axially relative to cylindrical wall 31, is a nozzle 35 which is connected to a source of gas under pressure through a conduit 36. Also provided on cap plate 29 is an inlet intercommunicating the interior of projecting section 30 and a fixture 38 which is adapted to be connected through a hose with a source of fluidizing gas under pressure. Cap number 28 is comparable to cap member 27 with the exception of a nozzle for injecting a gas under pressure into the material passageway of conduit 11.

With the component assembled as shown in FIG. 1 and installed as a segment of a transport line for pneumatically conveying a bulk material, the material will flow through the passageways of conduits 11, 12 and 14 and transition sections 13 and 15, impelled by the injection of gas under pressure through various nozzles such as nozzle 35. Fluidizing air injected through inlets 21, 22, 24, 26 and 38, and comparable inlets in conduit 14 and transition section 15 will permeate through the inner permeable conduits of such various conduits and sections to provide a boundary layer consisting of fluidizing gas and material particles along the passageways therethrough to facilitate and enhance the flow of material therethrough. When the system is shut down and it may be desired to convey another material which could be contaminated by any residue of the previous material conveyed, the transport line may be cleaned by disassembling conduit 12 and 14 and comparable conduits, removing any residue from such conduits and reassembling them and cleaning conduits 11 merely by removing clamps 33, removing the cap members and obtaining access to the interiors thereof. Although several of the segments of the transport line must be disassembled and reassembled to obtain access to the interiors thereof, segments such as shown in FIG. 1 require only that the end caps be removed for obtaining access to the interiors thereof. Accordingly, time, labor and productivity is saved by the use of such segments.

From the foregoing detailed description, it will be evident that there are a number of changes, adaptations and modifications of the present invention, which come within the province of those persons having ordinary skill in the art to which the aforementioned invention pertains. However, it is intended that all such variations not departing from the spirit of the invention be considered as within the scope thereof as limited solely by the appended claims.

I claim:

1. A component of a transport line for pneumatically conveying bulk materials, comprising:

a first conduit having an open end;

a second conduit, connected to said first conduit at an angle relative thereto having the interior thereof communicating with the interior of said first conduit to provide a material flow passageway therethrough; and a readily removable cap member detachably mounted on said first conduit, closing said open end thereof, wherein said open end of said first conduit is disposed in alignment with a length of the interior of said first conduit to provide ready access to said interior upon removal of said cap member to facilitate the removal of material settling therein, and said cap member includes a section extendable into said first conduit when said cap member is mounted on said first conduit, having a peripheral side wall formed of an impermeable material and an end wall formed of a permeable material and an inlet for injecting a fluidizing gas into said extendable section.

2. A component according to claim 1 including means for detachably clamping said cap member to said first conduit.

3. A component according to claim 1 including a nozzle mounted in said cap member for injecting a gas under pressure into said first conduit.

4. A component according to claim 1 wherein said cap member includes a peripheral portion which may be mated to a peripheral flange portion of said first conduit for detachably mounting said cap member to said first conduit.

5. A component according to claim 4 including a nozzle mounted in said cap member for injecting a gas under pressure into said first conduit.

6. A component according to claim 1 including a nozzle mounted on said cap member and extending through said extendable section for injecting a gas under pressure into said first conduit.

7. A component according to claim 6 wherein said end wall of said extendable section is planar and disposed at an angle relative to the longitudinal centerline of said extendable section.

8. A component according to claim 1 wherein said first conduit is provided with a second open end and including a second cap member, detachably mounted onto said first conduit at an angle relative thereto, having an interior thereof communicating with the interior of said first conduit providing a material flow passageway through said conduits.

9. A component according to claim 8 including a third conduit connected to said first conduit at an angle relative thereto, having an interior thereof communicating with the interior of said first conduit providing a material flow passageway through said conduits.

10. A closure member for an open end of a first conduit forming a component of a transport line for pneumatically conveying a bulk material, having a second conduit connected thereto at an angle and the interior thereof communicating with the interior of said first conduit to provide a material flow passageway therethrough, comprising:

a cap member detachably mountable on said first mentioned conduit in closing relation relative to said open end thereof, including a section extendable into said first mentioned conduit when said cap member is mounted on said first conduit, having a peripheral side wall formed of an impermeable material and an end wall formed of a permeable material, and an inlet for injecting a fluidizing gas into said extendable section.

11. A cap member according to claim 10 including means for detachably clamping said cap member to said first conduit.

12. A cap member according to claim 11 including a nozzle mounted on said cap member for injecting a gas under pressure into said first conduit.

13. A closure member according to claim 10 wherein said cap member includes a peripheral portion which may be mated to a flange portion of said first conduit for detachably mounting said cap member to said first conduit.

14. A closure member according to claim 13 including a nozzle mounted in said cap member for injecting a gas under pressure into said first conduit when mounted thereon.

15. A closure member according to claim 10 wherein said cap member includes a annular peripheral portion which may be mated to an annular flange portion of said first mentioned conduit, and including an annular clamp for detachably connecting said peripheral portion of said cap member to said annular flange of said first conduit when mated together.

16. A closure member according to claim 15 including a nozzle mounted in said cap member for injecting a gas under pressure into said first conduit when mounted thereon.

17. A closure member according to claim 10 including a nozzle mounted on said cap member and extending through said extendable section for injecting a gas under pressure into said first conduit when mounted thereon.

18. A closure member according to claim 10 wherein said extendable section includes a cylindrical side wall portion formed of an impermeable material and a planar end wall disposed at an angle relative to the axis of said wall, formed of a permeable material.

19. A closure member according to claim 18 wherein said nozzle is mounted on said cap member and extends axially through said extendable section.

* * * * *